United States Patent [19]

Raines

[11] Patent Number: 5,212,351
[45] Date of Patent: May 18, 1993

[54] INSULATING BOOT FOR ELECTRICAL DEVICE MOUNTED IN CONNECTOR BOX

[76] Inventor: George D. Raines, 1848 Old Barnwell Rd., Lexington, S.C. 29073

[21] Appl. No.: 807,109

[22] Filed: Dec. 13, 1991

[51] Int. Cl.$^5$ .......................................... H01B 17/38
[52] U.S. Cl. ................................ 174/138 F; 174/53; 174/137 R
[58] Field of Search ............... 174/138 F, 1, 53, 54, 174/110 R, 137 R, 138 G, 135

[56] References Cited

U.S. PATENT DOCUMENTS

| | | | |
|---|---|---|---|
| 812,797 | 2/1906 | Knudson . | |
| 2,120,150 | 6/1938 | Marshall | 174/138 F |
| 2,636,065 | 4/1953 | Fiske | 173/259 |
| 2,862,997 | 12/1958 | Veitch et al. | 174/138 |
| 2,888,509 | 5/1959 | Ekvall et al. | 174/5 |
| 3,459,870 | 8/1969 | Plummer | 174/5 |
| 3,467,768 | 9/1969 | Shorey | 174/138 |
| 3,742,123 | 6/1973 | Haub, Jr. | 174/138 |
| 3,937,552 | 2/1976 | Parsons | 174/138 F X |
| 3,970,772 | 7/1976 | Ballard | 174/53 |
| 4,576,428 | 3/1986 | DeLuca et al. | 339/94 |

*Primary Examiner*—Leo P. Picard
*Assistant Examiner*—Hyung S. Sough
*Attorney, Agent, or Firm*—Michael A. Mann

[57] ABSTRACT

An insulating boot for use with an electrical device that is attached to a outlet box. The box is attached to wall studs and may hold one or more electrical device, such as snap or dimmer switches, electrical outlets, television cables, telephone jacks and the like. The boot is made of a non-conducting, elastic material in the form of a strip the ends of which adhere to form a loop that snap around the circumference of the device. A second strip follows a second circumference around the back of the device and attaches by adhering to the first strip at a position between the ends of the first strip so as to to interfere with the attachment of the two ends of the first strip. The insulating boot prevents the shorting of the terminal of a device against the grounded outlet box wall or against the terminals of an adjacent device.

9 Claims, 2 Drawing Sheets

INSULATING BOOT FOR ELECTRICAL DEVICE MOUNTED IN CONNECTOR BOX

BACKGROUND OF THE INVENTION

1. Field of the Invention:

The present invention relates to insulating boots for use with electrical devices mounted in electrical outlet boxes.

2. Discussion of Background:

A variety of electrical devices are installed in the walls of homes and offices. Electrical devices typically include electrical outlets, snap light switches, dimmer light switches, telephone jacks and television cable connections. These devices are mounted within outlet boxes, which are metal boxes substantially but not completely closed on five of their six sides. Outlet boxes are attached to the wall studs or other framing in such a way that the electrical devices will be flush with the wall surface when attached thereto (and a cover plate placed thereover). An outlet box may have several holes for admitting electrical wires or cables. The outlet box is grounded but one or more terminals on the device installed therein will be at an electrical potential above ground potential.

The spacing between the device and the box is small. For example, a typical commercial grade snap switch is one and one-quarter inches wide by two and one-quarter inches high. It will be placed in a box that is typically one and seven-eighths wide by three inches high. Thus, there will be five-eights inch to split between the top and the bottom of the device and three-quarters inch to split between the sides of the device, which is where the terminals are, and the sides of the box. Shorting an electrical terminal against the box is not only possible but all too easy to do.

In many cases, several such devices, especially light switches and electrical outlets, may be placed side by side in one larger outlet box. These ganged arrays of devices present a special electrical shorting problem. Because the electrical terminals are on the sides of the devices, adjacent devices can be shorted to each other when contact is made in the course of servicing or installing these devices if still receiving power, as they must be when trouble-shooting a circuit.

When two or more devices are ganged together in a single outlet box, they are often served with alternate electrical phases, which results in a higher effective voltage across the terminals of adjacent devices. For example, if the voltage available is two-phase, the adjacent terminals can have a 220 volt difference based on 110 VAC. It is not uncommon for the voltage difference between two adjacent devices to be as much as 480 VAC. This situation is a violation of the National Electrical Code, Section 380-8(b) (1990), which requires that a grouping of switches be avoided unless the voltage between adjacent switches does not exceed 300 volts, or unless the enclosures have permanently installed barriers between adjacent switches. Unfortunately, no outlet boxes are known to be commercially available that have "permanently installed barriers." Furthermore, this requirement is routinely overlooked by electrical engineering firms in specifying the electrical requirements of a home or office. The consequences of shorting 480 volts is damage to property and injury to the electrician.

Boots that protect electrical devices against moisture and vermin are known. See U.S. Pat. No. 4,576,428 issued to DeLuca for an example of such a device. Wire wrappings to isolate wires electrically are also known, as illustrated by the device disclosed in U.S. Pat. No. 4,742,123 issued to Haub, Jr. Insulators for adjacent terminals are also known. See U.S. Pat. No. 2,636,065, issued to Fiske.

However, there remains a need for an easily implementable solution to the problem of shorting the electrical terminals of electrical devices against the sides of the outlet box in which it is mounted or against an adjacent device.

SUMMARY OF THE INVENTION

According to its major aspects and broadly stated, the present invention is an insulating boot for use with an electrical device having one or more electrical terminals that fits within an electrical outlet box. The insulating boot comprises a first strip of non-conducting material having two ends, one end having an adhesive in order to attach it to the other end when it is wrapped about a circumference of the electrial device. The boot is wrapped in such a way and dimensioned so that it covers the electrical terminals, which are usually on the sides of the device. Preferably, the device has a second strip, integral or otherwise attached at one end to the first strip and adherable to the first strip at the other end so that it runs along the back of the device, in a direction orthogonal to the first strip, to help secure the boot in position on the device. Rather than a strip with two ends, the present boot can be in the form of a loop. In either embodiment, it is preferably made of rubber or other non-conducting elastic material and one to one-and-one-half inches wide.

An important feature of the present invention is the fact that, in one embodiment, it is a single strip or loop that encircles the device to cover the electrical terminals. As such the boot is easily and quickly installed on the device but provides the necessary insulation between adjacent devices. The second strap or loop provides additional stability and holding power. The insulating boot is simpler and easier to use than caps on the terminals or wrapping.

Another important and related feature is the fact that the device is made of an elastic material. Being elastic, it grips and conforms to the device. Furthermore, it will not slip because of the frictional engagement. Thus, the device will fit and hold to a variety of shapes of devices. It can be snapped onto a device either at the time the device is packaged for sale or just before installation.

Still another feature of the present invention is the position of the attachment of the second strip to the first. The second strip should attach to the first between the ends of the first strip so that the overlap of the attachment of the second strip to the first strip does not interfere with the attachment of the two ends of the first strip or with the positions of wires that will be attached to the device's terminals.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
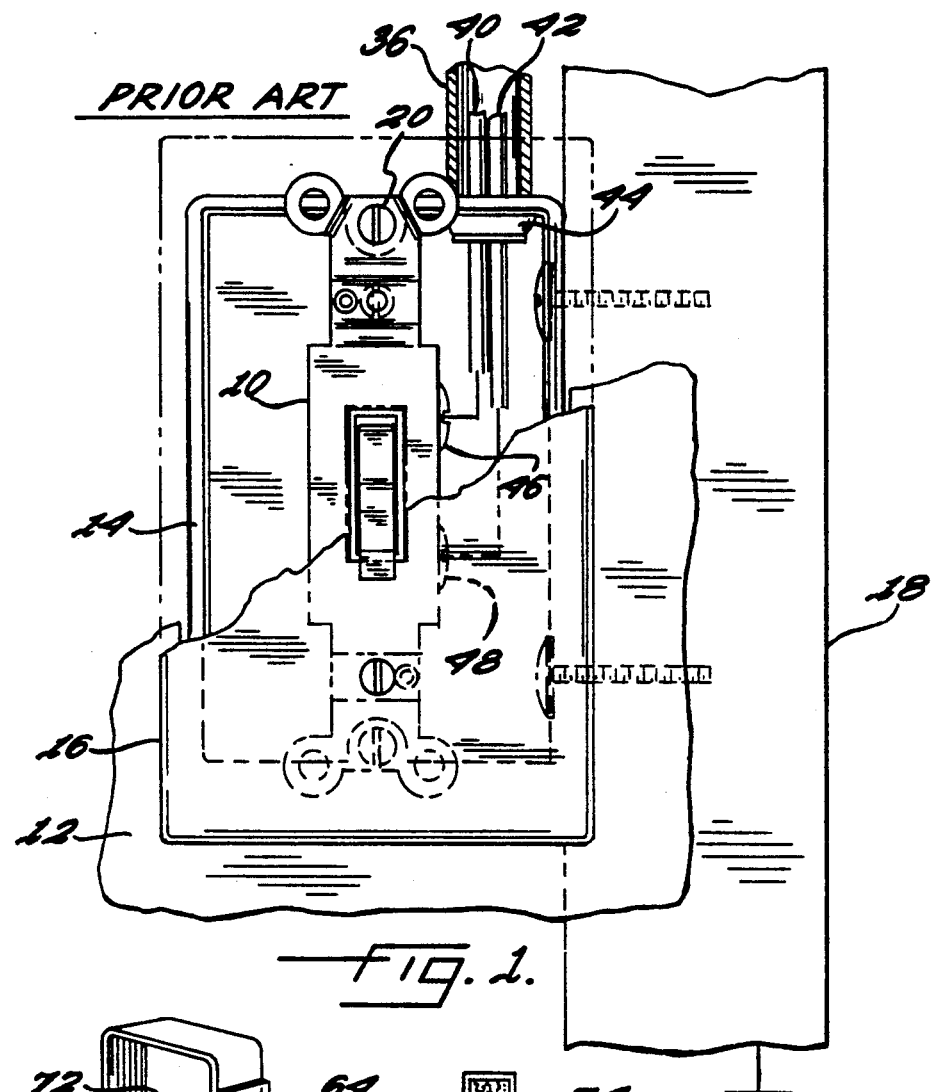
FIG. 1 is a front view of an eletrical switch plate partially cut away showing an electrical switch in an electrical outlet box according to the prior art.

Referring now to FIG. 1, there is illustrated a view of a snap switch 10 mounted on a wall 12 in an outlet box 14. A switch plate 16 covers switch 10 and is, in FIG. 1, shown partially cut away. Outlet box 14 is fastened to a stud 18, usually metal in commercial applications, in wall 12. Switch is attached to outlet box 14 by bolts 20. Through a conduit 36, three wires 38, 40, 42 enter outlet box 14 from a hole 44 in its top and are attached to terminals 46, 48 on the sides of switch 10. Conduit 36 grounds the system directly by attachment to box 14. This configuration is a typical, prior art configuration of this type of device and is representative of the arrangement of other electrical devices.

Figure 2:
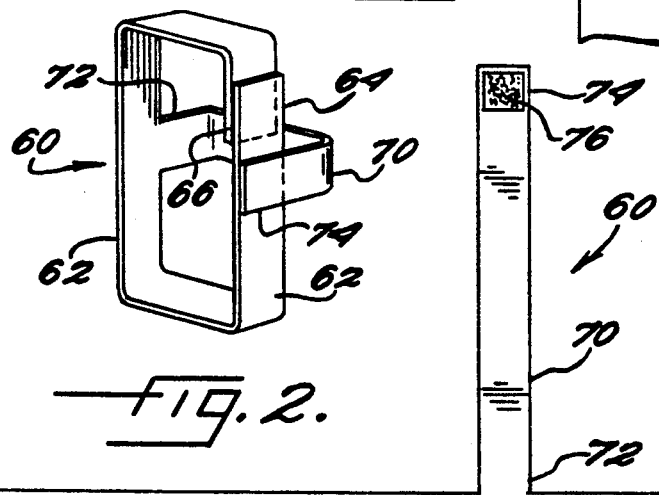
FIG. 2 is a perspective view of the boot in its attached form according to a preferred embodiment of the present invention.
Figure 3:
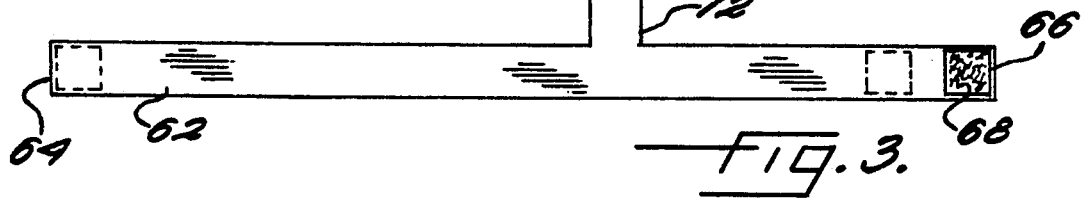
FIG. 3 is a plan view of the boot in its unattached form according to a preferred embodiment of the present invention.

FIGS. 2 and 3 illustrate an insulating boot 60 according to a preferred embodiment of the present invention. In FIG. 2, boot 60 is shown formed as it would be for use around a device; in FIG. 3, boot 60 is shown disassembled. Boot 60 has a first strip 62 of a non-conducting material having a first end 64 and a second end 66. On second end 66 is an adhesive 68 (FIG. 3) that will allow first end 64 to adhere to second end 66. Adhesive 68 may be on both ends or just one end, or may be some other means for attaching first end to second end. Adhesive 68 may be covered temporarily with a peelable covering, awaiting use.

A second strip 70 of the same material may be formed integrally with first strip 62 or may be attached to it between the ends 64, 66 of first strip 62. Second strip 70 will run along a circumference of a device that is orthogonal to the circumference followed by first strip 62 for better holding capability and stability. Second strip 70, if not integral with first strip 62 but having a first end 72 attached to or integral with first strip 62 and an opposing second end 74, should be formed so that second end 74 attaches to first strip 62 between first and second ends 64, 66 of first strip 62 so that interference with the overlap of the first and second ends 64, 66 of first strip 62 does not occur. Second end 74 of second strip 72 also carries an adhesive 76 so that it can adhere to first strip 62.

Figure 4:
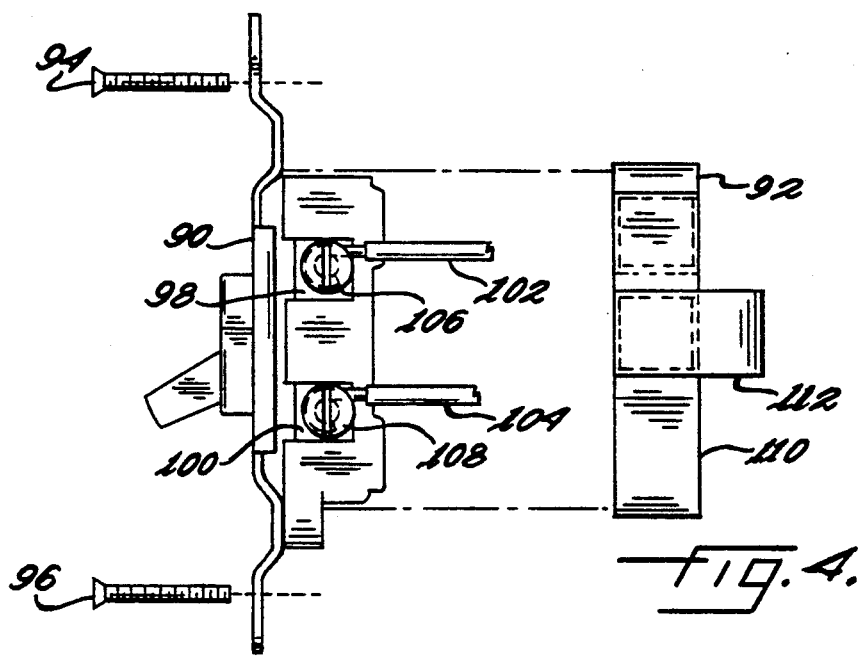
FIG. 4 is an exploded, side view of a switch with a boot according to a preferred embodiment of the present invention.

Referring now to FIG. 4 which shows a side view of a device, again a snap switch 90 with an insulating boot 92 according to the present invention. Snap switch 90 is held in place by two bolts 94, 96. On its side, snap switch 90 has two electrical terminals 98, 100 where two wires 102, 104 are fastened by screws 106, 108. Over switch 90 fits boot 92. First strip 110 encircles a first circumference of switch 90; second strip 112 partially encircles a second circumference of switch 90, the second circumference being orthogonal to the first. Second strip 112 attaches to first strip 110 in such a way that it does not interfere with the overlap of the first and second ends of first strip 110, and, moreover, does not interfere with wires 102, 104.

Figure 5:
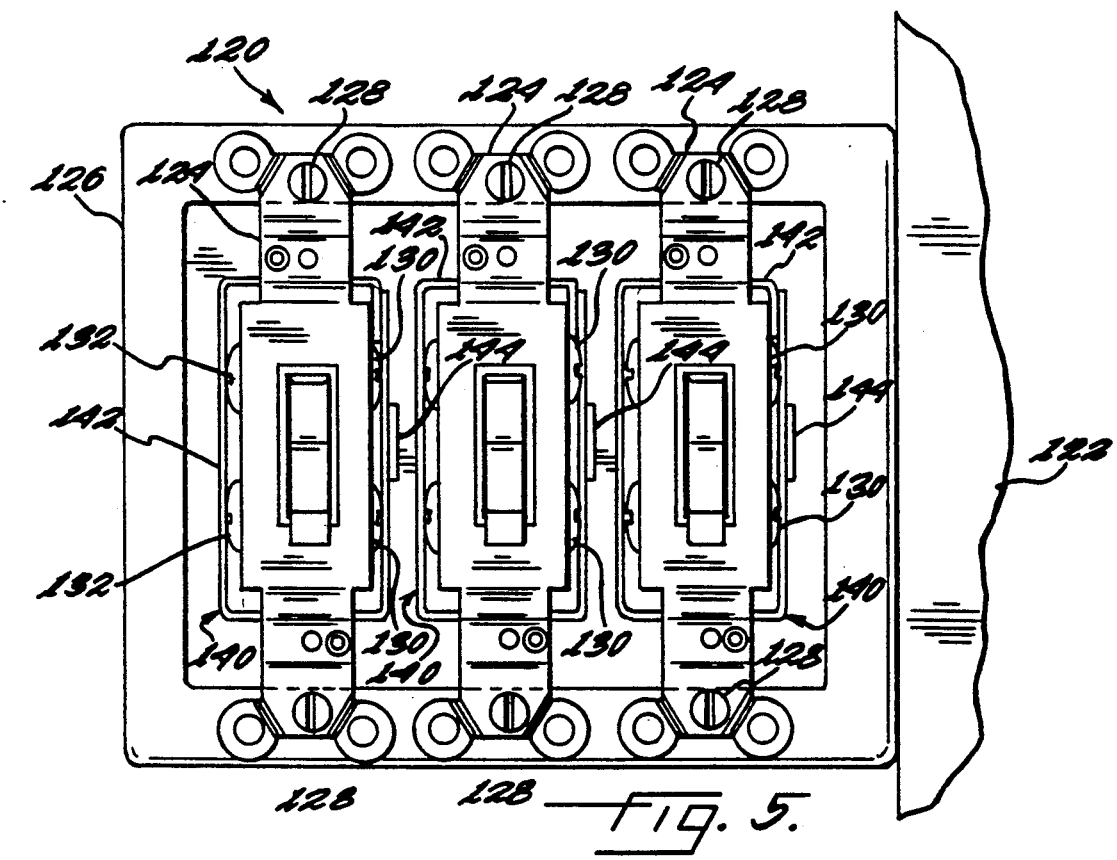
FIG. 5 is a front view of ganged switches with boots according to a preferred embodiment of the present invention.

FIG. 5 shows an array 120 of three snap switches secured to a wall stud 122. Each switch 124 is secured to outlet box 126 by a pair of bolts 128 and each has two terminals 130 on one side and two terminals 132 on the other side. Terminals 130 are for two pole switches; terminals 132 are for use as three way and four way switches. An insulating boot 140 is fitted to each, separate switch 124. Each boot 140, furthermore, has a first strip 142 and a second strip 144. Second strip 144 is shown being integral with first strip 142 at its first end but attached by an adhesive to the first end of first strip 142 between its first end and second end. Each switch 124 is insulated from the adjacent switches 124.

Upon installation, wires 102, 104 that are to be connected to terminals 98, 100 of an electrical device such as switch 90 are fed through the loop formed by first strip 110 of an insulating boot 92 according to a present invention (see FIG. 4). Wires 102, 104 are connected to the terminals of switch 90 and then boot 92 is snapped into place around switch 90 so that boot 92 covers terminals 98, 100. If a second strip 112 is part of the embodiment of boot 92 used, the free end of second strip 112 is brought about the back of switch 90 and pasted to the side of first strip 110. Switch 90 is then bolted to the outlet box with boot 92 in place.

Boot 92 is preferably made of rubber or other non-conducting material and first strip 110 thereof is between one and one-and-one-half inches wide so that it can easily cover terminals 98, 100. Rather than being made of two orthogonal strips, boot 92 can be made of two loops, one formed to be integral with the first. If strips are used and the ends are to be joined by an adhesive, a rubber cement can be used, covered with peelable paper until ready for use.

It will be apparent to those skilled in the art that many changes and substitutions can be made to the preferred embodiment herein described without departing from the spirit and scope of the present invention as defined by the appended claims.

What is claimed is:

1. An insulating boot for use with an electrical device having electrical connections, a firs circumference and a second circumference, and an electrical outlet box, said insulating boot comprising:

a first strip of non-conducting material having a first end and a second end, said first end carrying an adhesive so that said first end will adhere to said second end when said first strip is wrapped about said electrical device, said strip dimensioned to fit between said electrical device and said electrical outlet box and cover said electrical connections when wrapped about said electrical device; and a second strip of material, said second strip having a first end and a second end, said first end of said second strip integrally attached to said first strip between said first and second ends of said first strip said second strip being at substantially right angle to said first strip, said second end of said second strip carrying an adhesive so that said second end of said second strip can be attached to said first strip between said first and said second ends of said first strip, said first strip following said first circumference and said second strip following said second circumference.

2. The insulating boot as recited in claim 1, wherein said material is rubber.

3. The insulating boot as recited in claim 1, wherein said first strip is between one inch and one and one half inches wide.

4. The insulating boot as recited in claim 1, wherein said second end of said second strip adheres to said first strip at a different location along first strip than where first end and second end of said first strip adhere to each other.

5. The insulating boot as recited in claim 1, wherein said material is rubber and said first strip is between one inch and one and one half inches wide.

6. The insulating boot as recited in claim 1, wherein said material is rubber and said second end of said second strip adheres to said first strip at a different location along first strip than where first end and second end of said first strip adhere to each other.

7. The insulating boot as recited in claim 1, wherein said first strip is between one inch and one and one half inches wide and further comprising a second strip of material, said second strip having a first end and a second end, said first end of said second strip attached to said first strip between said first and second ends of said first strip, said second end of said second strip being attachable to said first strip between said first and second ends of said first strip, said first strip following said first circumference and said second strip following said second circumference.

8. The insulating boot as recited in claim 1, further comprising a loop of non-conducting material, said loop integral with said first strip and running from one side of said first strip to another side of said first strip.

9. An insulating boot for use with an electrical device having electrical connections, a first circumference and a second circumference, and an electrical outlet box, said insulating boot comprising a first strip of non-conducting material having a first end and a second end, said first end carrying adhesive so that said first end will adhere to said second end when said first strip is wrapped about said electrical device, said first strip being between one and one-and one-half inches wide so as to fit between said electrical device and said electrical outlet box and cover said electrical connections when wrapped about said electrical device, said boot having a second strip with a first end and second end, said first end integrally attached to said first strip between said first end and said second end of said first strip, said second strip being at substantially right angle to said first strip, said second end of said second strip being attachable to said first strip, said second end of said second strip carrying adhesive and attaching to said first strip between said first end and said second end of said first strip at a different position along said first strip than where said first end and said second end of said first strip adhere together.

* * * * *